United States Patent
Ryu et al.

(10) Patent No.: US 8,310,988 B2
(45) Date of Patent: Nov. 13, 2012

(54) METHOD OF MAC HEADER GENERATION AND DATA TRANSMITTING

(75) Inventors: Ki Seon Ryu, Gyeonggi-do (KR); Yong Ho Kim, Gyeonggi-do (KR); Tae Gon Kong, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 12/602,986

(22) PCT Filed: Jun. 3, 2008

(86) PCT No.: PCT/KR2008/003105
§ 371 (c)(1),
(2), (4) Date: Dec. 3, 2009

(87) PCT Pub. No.: WO2008/150088
PCT Pub. Date: Dec. 11, 2008

(65) Prior Publication Data
US 2010/0177693 A1    Jul. 15, 2010

Related U.S. Application Data

(60) Provisional application No. 60/941,946, filed on Jun. 4, 2007.

(30) Foreign Application Priority Data

Jul. 18, 2007   (KR) .................... 10-2007-0071554

(51) Int. Cl.
*H04W 40/00*   (2009.01)
*H04J 3/24*    (2006.01)

(52) U.S. Cl. ........................................ 370/328; 370/474
(58) Field of Classification Search .................. 370/328, 370/338, 349, 474
See application file for complete search history.

(56) References Cited

U.S. PATENT DOCUMENTS

| | | | |
|---|---|---|---|
| 6,788,707 B1 | 9/2004 | Horton et al. | |
| 2003/0007512 A1* | 1/2003 | Tourunen et al. | 370/475 |
| 2005/0249222 A1* | 11/2005 | van Kampen et al. | 370/395.5 |
| 2006/0078001 A1* | 4/2006 | Chandra et al. | 370/473 |
| 2006/0153203 A1* | 7/2006 | Del Prado Pavon et al. | 370/400 |
| 2007/0297319 A1* | 12/2007 | Roberts | 370/202 |
| 2007/0298778 A1* | 12/2007 | Chion et al. | 455/422.1 |
| 2008/0080559 A1* | 4/2008 | Singh | 370/477 |

FOREIGN PATENT DOCUMENTS

| | | |
|---|---|---|
| KR | 10-2006-0044237 | 5/2006 |
| KR | 10-2006-0074795 | 7/2006 |

* cited by examiner

*Primary Examiner* — Brian D Nguyen
(74) *Attorney, Agent, or Firm* — Lee, Hong, Degerman, Kang & Waimey

(57) ABSTRACT

A method of generating MAC header and a method of transmitting data using the generated MAC header are disclosed. A mobile station can receive a message from a base station, the message including an indicator for identifying a service flow (SF). If the mobile station is connected with the base station to generate the service flow, the mobile station and the base station can map the service flow with the indicator. Accordingly, the base station can generate MAC header, which includes the indicator and a parameter representing whether the MAC header has been compressed.

6 Claims, 13 Drawing Sheets

Compressor state diagram :

Decompressor state diagram :

METHOD OF MAC HEADER GENERATION AND DATA TRANSMITTING

CROSS-REFERENCE TO RELATED APPLICATIONS

This application is the National Stage filing under 35 U.S.C. 371 of International Application No. PCT/KR2008/03105, filed on Jun. 3, 2008, which claims the benefit of earlier filing date and right of priority to Korean Application No. 10-2007-0071554, filed on Jul. 18, 2007, and also claims the benefit of U.S. Provisional Application Ser. No. 60/941,946, filed on Jun. 4, 2007.

TECHNICAL FIELD

The present invention relates to a mobile communication system, and more particularly to a method of generating MAC header and a method of transmitting data using the generated MAC header.

BACKGROUND ART

Generally, an Internet based communication system includes a protocol stack of five layers, wherein each protocol layer is configured as illustrated in FIG. 1.

FIG. 1 illustrates an example of an Internet protocol stack, which is generally used.

Referring to FIG. 1, a protocol stack includes an uppermost layer, which is an application layer and is to support network application such as FTP/HTTP/SMTP/RTP. The protocol stack further includes a transport layer and a network layer, wherein the transport layer serves to transmit data between hosts using TCP/UDP protocol, and the network layer performs setup of a data transmission path from a source to a destination through IP protocol. Furthermore, the protocol stack includes a link layer and a physical layer, wherein the link layer serves to perform data transmission and media access control (MAC) between peripheral network entities through PPP/Ethernet protocol, etc, and the physical layer is a lowest layer which performs data transmission of a bit unit using wire or wireless media.

FIG. 2 illustrates an operation of each layer for data transmission, which is generally used.

Referring to FIG. 2, a transport layer of a transmitting side generates a new data unit by adding header information to message payload received from the uppermost layer, i.e., application layer. The transport layer transmits the data unit to the lower layer, i.e., network layer. The network layer generates a new data unit by adding header information used for the network layer to the data received from the transport layer, and transmits the data unit to the link layer belonging to the lower layer. The link layer generates a new data unit by adding header information used for the link layer to the data received from the upper layer, and transmits the generated data unit to the physical layer belonging to the lowest layer. The physical layer transmits the data unit, which has been received from the link layer, to a receiving side.

The physical layer of the receiving side receives the data unit from the transmitting side and transmits the data unit to its upper layer, i.e., link layer. The receiving side processes a header added to each layer and transmits message payload, from which header has been removed, to the upper layer. Data transmission and reception between the transmitting side and the receiving side are performed through the above procedure.

As illustrated in FIG. 2, for data transmission and reception between the transmitting side and the receiving side, each layer performs control functions such as data addressing, routing, forwarding, and data retransmission by adding protocol header. However, in various application services such as voice over IP (VoIP), Internet game, and messenger service, it is likely that payload of IP packet may have a size similar to or smaller than that of the header. Generally, in case of end to end connection where various entities are provided for data transfer path, each header performs an important role. A header used in various layers can be compressed at a small size within a single link.

Mobile communication systems define MAC header of a fixed length to support a corresponding protocol in accordance with each system. For example, MAC header of a broadband wireless access system based on IEEE 802.16 system has a fixed length of 6 bytes.

Generally, real-time service such as VoIP is characterized in that packets are periodically generated, and their length is short and constant. The real-time service such as VoIP should frequently provide a service. Accordingly, a problem occurs in that a protocol header used for the service may act as large overhead. In order to solve this problem, a header compression algorithm can be used in a third layer or higher, such as ROHC. However, since different protocols are used for each system and a unique header for each protocol is defined in layers lower than MAC layer (second layer), compression of the MAC header is not defined separately. However, in case of service such as VoIP where short packets are generated frequently, MAC header of 6 bytes may act as MAC overhead in comparison with user data of 33 bytes or 7 bytes. For this reason, it is necessary to consider compression of MAC header in the second layer or lower to reduce MAC overhead.

DETAILED DESCRIPTION OF THE INVENTION

Technical Problems

Accordingly, the present invention is directed to a method of generating MAC header and a method of transmitting data using the generated MAC header, which substantially obviate one or more problems due to limitations and disadvantages of the related art.

An object of the present invention is to provide an efficient communication method and a method of compressing header.

Another object of the present invention is to provide a method of transmitting and receiving data by compressing MAC header information to reduce MAC overhead and efficiently use radio resources.

Other object of the present invention is to provide a method of generating a MAC header of a second layer through compression between a transmitting side and a receiving side in a mobile communication system and a method of efficiently transmitting data of MAC layer.

Technical Solutions

To achieve the object and other advantages and in accordance with the purpose of the invention, as embodied and broadly described herein, a method of generating MAC header in a wireless access system comprises receiving a message including an indicator for identifying a service flow (SF); mapping the indicator with the service flow if a transmitting side is connected with a receiving side to generate the service flow; and generating MAC header which includes the indicator and a parameter representing whether the MAC header has been compressed.

Preferably, the indicator included in the MAC header has a size smaller than CID. At this time, the MAC header includes at least one of a field for detecting whether error of the MAC header has occurred, a field representing a whole size of MAC message, a subheader indication field, and a field representing encryption. Also, the field representing whether the MAC header has been compressed includes at least one of an information bit representing whether compression has been performed and an information bit representing compression level.

In another aspect of the present invention, a method of generating MAC header in a wireless access system comprises forming association between a mobile station and a base station; receiving a map message including an identifier used to identify the mobile station when the base station allocates resources to the mobile station; and generating the MAC header which includes at least one of a flag field representing whether the MAC header has been compressed, CIND for identifying a service flow (SF), an error detection field for detecting whether the header has an error, and a field representing a size of MAC message, the CIND being uniquely used to identify the service flow within the mobile station.

In still another aspect of the present invention, a method of transmitting data from a receiving side of a mobile communication system comprises receiving data from a transmitting side, the data including a first uncompressed MAC header; transmitting a message to the transmitting side, the message including ACK signal if there is no error in the first MAC header and including NACK signal if there is an error in the first MAC header; and receiving data from the transmitting side, the data including a second MAC header generated in accordance with the message.

The second MAC header is generated by compression if the message includes the ACK signal, and is generated without compression if the message includes the NACK signal.

The second compressed MAC header includes at least one of a flag field representing whether the second MAC header has been compressed, CIND for identifying a service flow (SF), an error detection field for detecting whether the header has an error, and a field representing a size of MAC message, the CIND being uniquely used within a mobile station. In this case, the field representing a size of MAC message represents an increased or decreased size of a current MAC message from a previous MAC message. Also, the flag field includes at least one of an information bit representing whether compression has been performed and an information bit representing compression level.

In further still another aspect of the present invention, a method of transmitting data from a transmitting side of a mobile communication system comprises transmitting data including a first uncompressed MAC header; generating a second compressed MAC header if a message including ACK signal is received from a transmitting side, and generating a second uncompressed MAC header if a message including NACK signal is received from the receiving side; and transmitting data to the receiving side, the data including the second MAC header.

In further still another aspect of the present invention, a method of transmitting data in a broadband wireless access system comprises generating a service flow in a base station and a mobile station, allocating an indicator for identifying the service flow to the mobile station; generating MAC header, which includes the indicator, to allocate a corresponding service to the mobile station, the indicator being uniquely used in the mobile station; and transmitting a map message to the mobile station to allocate a resource region to the mobile station, the map message including a mobile station identifier uniquely used in the base station.

The resource region is an uplink resource region or a downlink resource region, and the map message is an uplink map message or a downlink map message.

In further still another aspect of the present invention, a method of transmitting data used in a wireless access system comprises generating a service flow in a base station and a mobile station, allocating an indicator for identifying the service flow to the mobile station, the indicator being uniquely used in the mobile station; transmitting a resource allocation request message to the base station, the resource allocation request message including mobile station identifier, which identifies a resource region allocated to the mobile station, and the indicator; receiving an uplink map message from the base station, the uplink map message including uplink resource region information allocated to the mobile station and the mobile station identifier; and transmitting uplink data through the uplink resource region.

The method further comprises transmitting a resource allocation request message to the base station if the uplink resource region allocated to the mobile station is insufficient, the resource allocation request message including the indicator.

Although a method of compressing MAC header of a downlink service flow has been exemplarily described in the embodiments of the present invention, which will be described below, in case of an uplink service flow, the mobile station can compress the MAC header and the base station can provide a feedback message to the mobile station. Also, in case of a downlink, the transmitting side serves as the base station and the receiving side serves as the mobile station. However, in case of an uplink, the transmitting side serves as the mobile station and the receiving side serves as the base station.

Advantageous Effects

According to the present invention, the following advantages can be obtained.

First of all, since the MAC header is transmitted by compression in accordance with the embodiments of the present invention, it is possible to reduce MAC overhead. Accordingly, it is possible to save radio resources.

Second, since data are transmitted and received using the compressed MAC header in accordance with a status of the system, it is possible to transmit and receive information more efficiently. Particularly, in case of data, which has frequently used and has payload of short length, such as real-time service of VoIP, it is possible to transmit and receive the data more efficiently.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Hereinafter, structures, operations, and other features of the present invention will be understood readily by the preferred embodiments of the present invention, examples of which are illustrated in the accompanying drawings.

To solve the aforementioned technical problems, the present invention is to provide a method of generating MAC header in a mobile communication system and a method of transmitting and receiving data using the generated MAC header. The present invention suggests a method of reducing MAC overhead, which is characterized in that MAC header of a second layer is compressed and then transmitted and received between a receiving side and a transmitting side.

According to one feature of the present invention, instead of the same connection identifier (CID) after a receiving side forms association with a transmitting side, connection index (CIND) allocated to each receiving side to identify the receiving side is used as an identifier of the receiving side to reduce a length of a header.

According to another feature of the present invention, after a receiving side forms association with a transmitting side, a fixed region is omitted in a region where an address of CID is recognized, and only a region variable in accordance with the receiving side is used to reduce a length of a header.

According to still another feature of the present invention, MAC header, which includes only a region required to represent the difference between a size of full MAC PDU and a size of a previous PDU, is generated in a region representing a length of full MAC PDU, so as to reduce a length of the full MAC PDU.

According to further still another feature of the present invention, to transmit and receive data using the aforementioned methods of generating MAC PDU, the present invention provides a method of compressing MAC header and a method of transmitting and receiving data, in which MAC PDU is transmitted using MAC header compressed continuously until NACK signal is received as much as a predetermined number of times, and information included in the MAC header is changed to update the MAC header.

An example of a header compression method includes an algorithm which compresses a header of a third layer or higher through ROHC (RObust Header Compression) scheme. The ROHC scheme is a header compression scheme which transmits compressed header information differently depending on each state of a compressor and a decompressor by dividing IP/UDP/RTP header into a static field and a dynamic field and making change pattern information of a protocol header in context, wherein the static field is not variable in accordance with the time while the dynamic field is variable in accordance with the time. If error occurs in accordance with a link state during a procedure of decompressing the compressed header, the decompressor reports the error to the compressor to update context through state shift and effectively process the compressed header.

Figure 1:
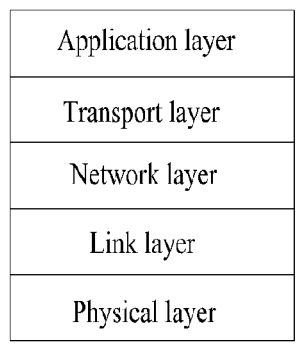
FIG. 1 is a diagram illustrating an example of an Internet protocol stack, which is generally used.
Figure 2:
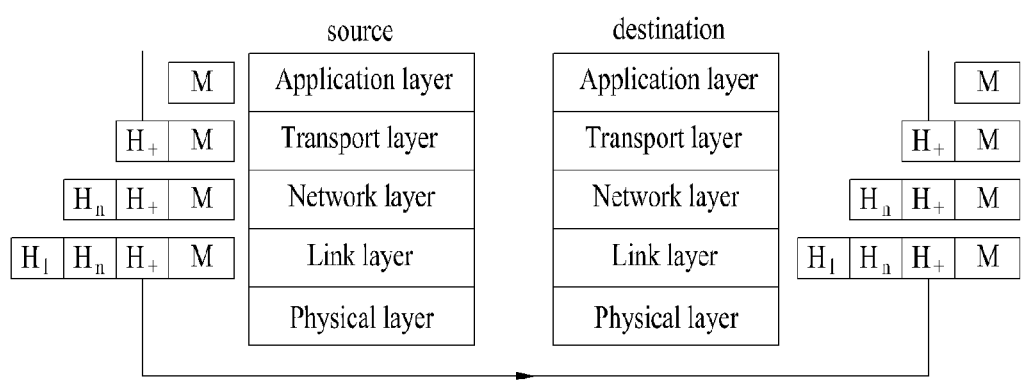
FIG. 2 is a diagram illustrating an operation of each layer for data transmission, which is generally used.
Figure 3:
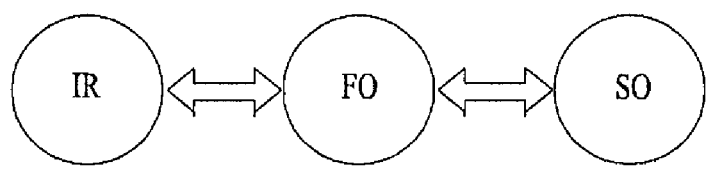
FIG. 3 is a diagram illustrating a state of a compressor in a transmitting side of ROHC.

FIG. 3 is a diagram illustrating a state of a compressor in a transmitting side of the ROHC.

Referring to FIG. 3, the ROHC compressor is represented by three states of initialization and refresh (IR), first order (FO), and second order (SO). Each state represents a procedure of updating context related to IP packet header of the decompressor without error. In this case, a compression rate of a packet header is increased.

If the decompressor transfers feedback packet to the compressor, the compressor transmits a header having a compression rate of low level to the decompressor so that the decompressor correctly updates header information having error.

The IR state represents a compressed state of low level. A main object of the IR state is to decompress context of the decompressor after the context of the decompressor is initiated or failed. In the IR state, the compressor transmits complete header information to the decompressor. The compressor stays in the IR state until the decompressor correctly receives the information.

A main object of the FO state is to efficiently transfer irregular fields from packet streams. In the FO state, the compressor little transfers information to the dynamic field and partially transfers compressed information thereto. The compressor enters the FO state when headers of the packet streams do not follow their previous pattern, and stays in the FO state until the decompressor obtains all parameters of a new pattern.

The SO state is to perform perfect header compression by means of prediction through a given SN if compression is optimized. The compressor is sufficiently convinced that all parameters required in other field have been obtained from the SN of the decompressor. The compressor cannot be convinced of a constant pattern of a header any more and is converted to the FO state when compression cannot be performed with only previous context information.

Figure 4:
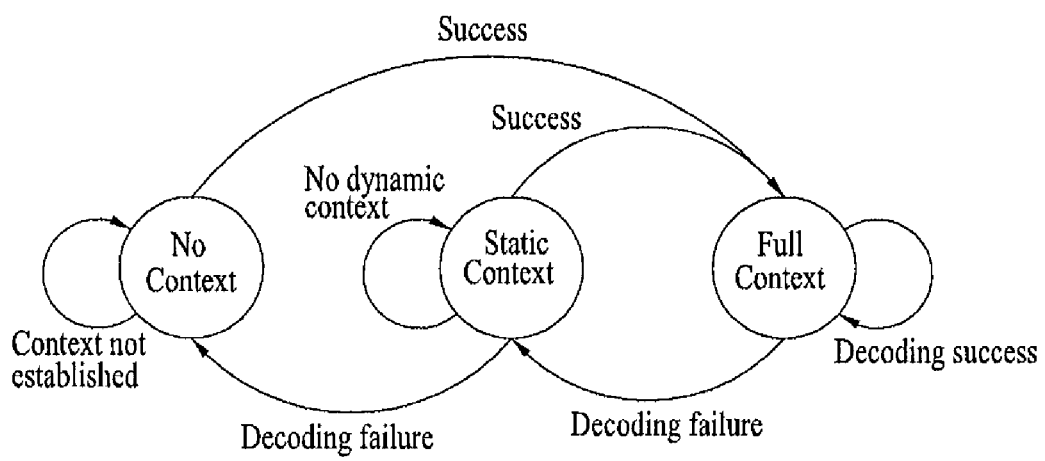
FIG. 4 is a diagram illustrating a state of a decompressor in a receiving side of ROHC.

FIG. 4 is a diagram illustrating a state of a decompressor in a receiving side of the ROHC.

Referring to FIG. 4, the ROHC decompressor represents 'No Context' state, 'Static Context' state, and 'Full context' state.

The 'No Context' state is the lowest state of the decompressor, and is shifted to the higher state if decompression is successfully performed. The decompressor starts decompression from the 'No Context' state. The 'No Context' state means that no packet has been successfully decompressed. The decompressor can be shifted to the 'Full Context' state when the transmitting side has correctly decompressed the compressed packet. If decompression failure is repeated, the decompressor can be shifted to the lower state. If the first decompression failure has occurred, the decompressor is shifted to the 'Static Context' state. The decompressor can be shifted to the 'Full Context' state again through packet reception of the FO state. Failure in packet decompression from the 'Static Context' state to the FO state causes the shift to the 'No context' state.

If decompression is successfully performed in all the three states of the decompressor, the decompressor is shifted to 'Full context' state. Repeated failure of the decompressor shifts the decompressor to the lower state. The decompressor does not try decompression in the 'No Context' state. Although decompression is performed in the 'Full context' state regardless of a type of received packets, the decompression is not always allowed in the other states. In the 'No context' state, decompression can be performed for only the IP packet having information of 'Static field'.

If the ROHC algorithm is used as described above, the protocol header of 40 bytes is compressed to at least 2 bytes to enable efficient use of radio resources. The ROHC algorithm is used as the header compression algorithm in the third layer or higher. In the layer lower than the second layer (i.e., MAC layer), different protocols are used for each system and a type of a unique header is not defined. Also, MAC header is not defined separately. Accordingly, in case of service such as VoIP where short packets are frequently used, MAC header of 6 bytes may act as overhead. Hereinafter, a method of compressing MAC header will be described.

Figure 5:
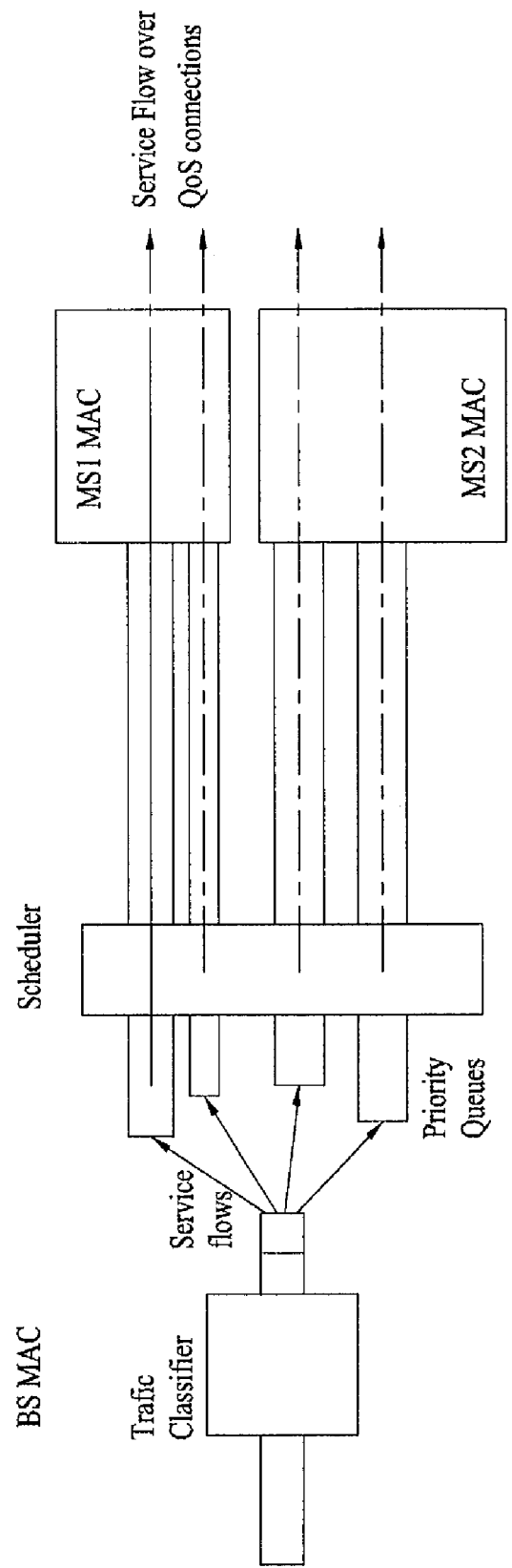
FIG. 5 is a diagram illustrating a service flow and connection used in IEEE 802.16 system.

FIG. 5 is a diagram illustrating a service flow (SF) and connection used in IEEE 802.16 system.

As illustrated in FIG. 5, to provide QoS of higher service flow (SF), logical connection of the MAC layer allows the SF to be mapped with logical connection where QoS parameter is defined. Also, the logical connection is defined to provide QoS in the MAC layer through proper scheduling for data transmission of corresponding connection. Types of connection defined in the MAC layer include management connection allocated from the MAC layer to each mobile station to manage the mobile station and transport connection mapped with the service flow for higher service data transmission.

Figure 6:
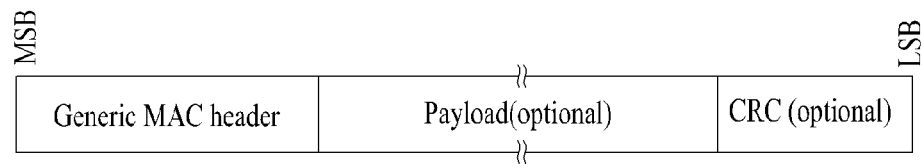
FIG. 6 is a diagram illustrating an example of MAC protocol data unit (PDU) defined in a wireless MAN mobile communication system based on IEEE 802.16 system, which is generally used.

FIG. 6 is a diagram illustrating an example of MAC protocol data unit (PDU) defined in a wireless MAN mobile communication system based on IEEE 802.16 system.

Generally, in a link layer (or MAC layer) of a second layer or lower and a physical layer, protocol according to each system such as LAN, Wireless LAN, 3GPP/3GPP2 or Wireless MAN and a header format of MAC PDU according to the protocol are defined respectively. The MAC header includes MAC address or link address of each node for data transfer between the respective nodes in the link layer, and can include header error check and link layer control information.

Referring to FIG. 6, each MAC PDU starts with MAC header of a constant length. The MAC header is located in front of payload of the MAC PDU. The payload of the MAC PDU includes a subheader, MAC SDU, and fragment. A length of payload information may be changed to express variable bytes. In this case, MAC sublayer can transmit various traffic types of upper layers without recognizing format or bit pattern of messages. All the reserved fields are set to '0' during transmission, and are disregarded during reception.

The MAC PDU may include cyclic redundancy check (CRC) for error detection. The CRC function can be performed in a physical layer of an OFDMA system. In the MAC PDU, all the reserved fields are designated as '0,' and are disregarded during reception.

Figure 7:
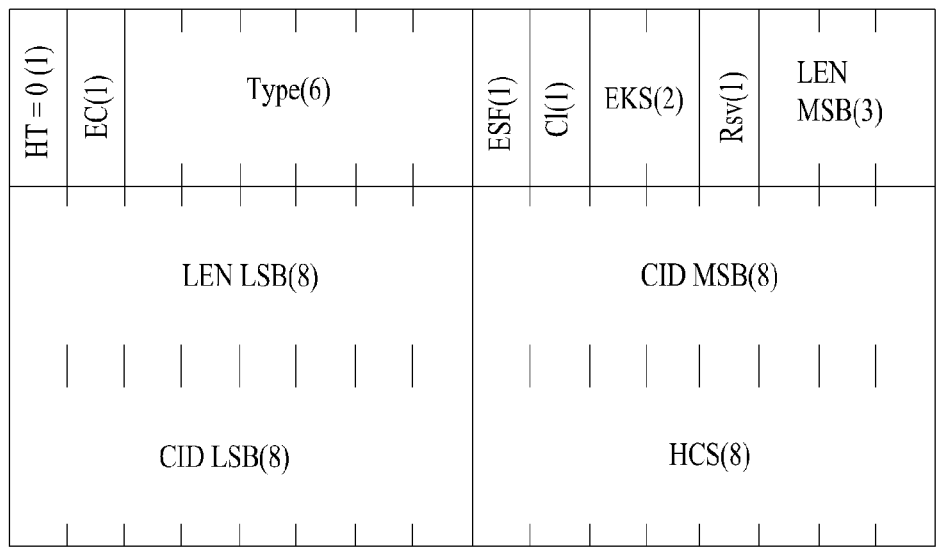
FIG. 7 is a diagram illustrating an example of MAC header used in a wireless MAN mobile communication system based on IEEE 802.16 system, which is generally used.

FIG. 7 is a diagram illustrating an example of MAC header used in a wireless MAN mobile communication system based on IEEE 802.16 system.

Referring to FIG. 7, six subheaders can be used for the MAC PDU together with the general MAC header. A subheader for each PDU is inserted next to the MAC header. Each field included in the MAC header will be described below.

An HT field represents a header type, and more particularly represents whether the corresponding MAC PDU is a general MAC header, which includes payload next to the header, or a signaling header for control of bandwidth request, etc. An EC field represents encryption control, and more particularly represents whether payload has been encrypted. A Type field represents the presence of a subheader suffixed next to the header and a type of a subheader. An ESF field represents the presence of an extended subheader suffixed next to the header.

Furthermore, a CI field represents whether CRC is suffixed next to payload. An EKS field represents an encryption key sequence number used for encryption. A LEN field represents a length of the MAC PDU. A CID (connection identifier) field represents a connection identifier to which the MAC PDU is transferred. Connection is used as an identifier of the MAC layer for data and message transfer between the base station and the mobile station, and CID serves to identify a specific mobile station or identify a specific service between the base station and the mobile station. A header check sequence (HCS) is used to detect error of the header. In FIG. 7, a number in a parenthesis next to each field name represents bits occupied by each field.

Figure 8:
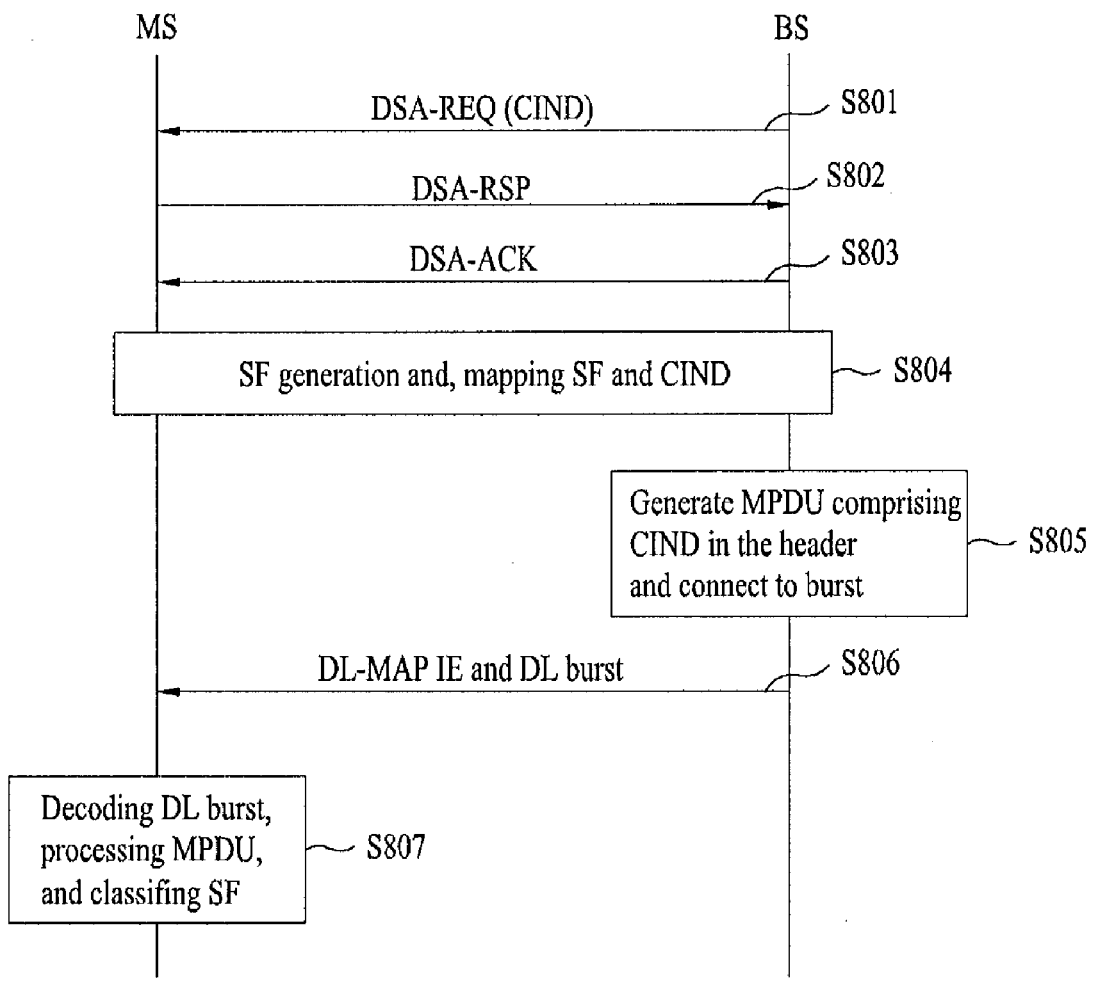
FIG. 8 is a flow chart illustrating a method of processing MAC PDU using a connection index (CIND) according to the embodiment of the present invention.

FIG. 8 is a flow chart illustrating a method of processing MAC PDU using a connection index (CIND) according to the embodiment of the present invention.

During the procedure of establishing service connection between the mobile station and the base station, the base station allocates CIND (Connection Index) to the mobile station through DSA-REQ message (S801).

The mobile station transmits DSA-RSP message to the base station in response to the DSA-REQ message (S802), and the base station transmits DSA-ACK message to the mobile station, whereby establishment of service connection between the mobile station and the base station is completed (S803).

The CIND received from the base station is mapped with a service flow (SF) provided by the base station (S804). If data traffic of the service flow generated by the base station occurs, the base station can represent that the data traffic is data of the corresponding service flow using CIND when generating MAC PDU in the MAC header (S805).

In step S805, the compression method of the MAC header can be used. According to an example of the compression of the MAC header, CID of the MAC header used for address allocation and service identification of the MAC PDU can be replaced with CIND within the receiving side. This is because that although CID is needed in case of initial connection between the mobile station and the base station, the base station can identify a service flow of a specific mobile station with only CIND allocated from the base station to each mobile station if connection between the mobile station and the base station is made.

CID is a unique identifier of 16 bits within the base station while CIND is a unique index of the mobile station and can be represented by 8 bits or shorter. Accordingly, the base station can compress the MAC header by using CIND (for example, 8 bits) of a short length instead of CID (for example, 16 bits) of a longer length when generating the MAC header.

However, the base station can use management CID of the mobile station, which is used to report allocation of physical burst for data transmission and reception to the mobile stations through a resource allocation map. The management CID of the mobile station is allocated to each mobile station within the base station, and is used for identification of the mobile station in the resource allocation map for downlink/uplink resource allocation.

Furthermore, for the same object as that of the management CID of the mobile station, separate identifier of the mobile station can be used to identify the mobile station when the base station allocates resources to the mobile station. In this case, the identifier of the mobile station can be represented by a shorter length than the CID of 16 bits.

At this time, the identifier of the mobile station, which is used when the base station allocates resources, is used to identify the mobile station from the resource allocation map. The identifier of the mobile station is a unique identifier given from the base station to the corresponding mobile station. The base station can allocate the identifier of the mobile station to the mobile station during the initial network access procedure.

Furthermore, when service connection between the mobile station and the base station is established, the base station can allocate connection index (CIND) to be included in the header compressed during corresponding service data transmission, in addition to the existing CID. However, in step S805, the base station may not allocate CID to the mobile station. In this case, CIND may be allocated instead of CID.

Furthermore, according to another example of the method of compressing MAC header, in step S805, the existing CID of 16 bits can be reduced, and then the reduced CID can be used. In this case, the base station and the mobile station can identify connection using the LSB of the CID.

Referring to FIG. 7, to describe another example of the method of compressing MAC header, the MAC header of the IEEE 802.16 system used in the embodiment of the present invention has a size of 6 bytes. In this case, CID has a size of 16 bits and is allocated from the base station to the mobile station during the service flow procedure. The base station can identify the service provided to the mobile station using 8 bits corresponding to the LSB by allocating CID to other service flow of the corresponding mobile station without overlap with the LSB. Namely, the MSB (for example, higher 8 bits) of the CID can be omitted from the MAC header to reduce the size of the MAC header.

At this time, whether to identify connection of the MAC PDU using the reduced CID and whether to use how many bits of the LSB of the CID for the MAC header can be negotiated between the mobile station and the base station during the initialization procedure of the mobile station and the connection establishment procedure, or can be reported from the base station to the mobile station through the resource allocation map during physical burst allocation.

The base station generates the MAC PDU using the MAC header compressed in step S805, performs encoding for the generated MAC PDU in data burst, and transmits the encoded data to the mobile station. At this time, the base station can provide resource allocation information to the mobile station through DL-MAP IE message. However, if resources are allocated through DL-MAP, CID (for example, management CID) allocated to each mobile station can be used (S806).

The mobile station performs decoding for the downlink data burst received from the base station, processes the MAC PDU, which includes CIND, and properly classifies the service flow (SF) mapped with the CIND (S807).

In FIG. 8, the downlink has been exemplarily described in accordance with the embodiment of the present invention. However, the embodiment of the present invention can be applied to the uplink. In this case, the mobile station can transmit encoded uplink data burst using uplink resources allocated from the base station.

According to the embodiment of the present invention described with reference to FIG. 8, compression of the MAC header using CIND instead of CID can be performed regardless of change of compression level, which is caused by error of the MAC header. Also, it is to be understood that terminologies used in FIG. 8 are only illustrative examples to describe the embodiment of the present invention and various modifications can be made in the terminologies within the range that does not depart from technical mapping of the present invention.

Figure 9:
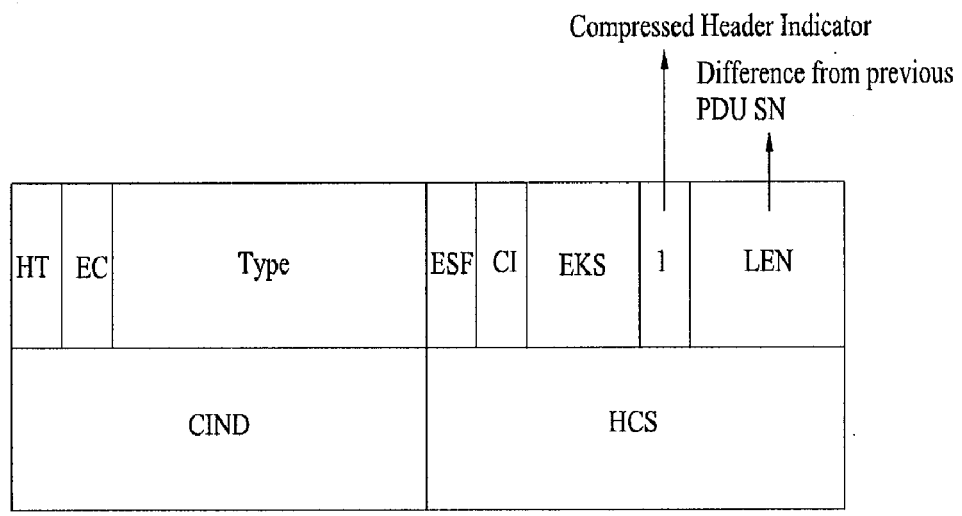
FIG. 9 is a diagram illustrating an example of a compressed MAC header according to the embodiment of the present invention.

FIG. 9 is a diagram illustrating an example of a compressed MAC header according to the embodiment of the present invention.

Referring to FIG. 9, it is noted that the MAC header of 6 bytes is compressed to 4 bytes in the IEEE 802.16 system which is one of various mobile communication systems. The general MAC header of FIG. 9 has a reserved field of 1 bit among header fields of 6 bytes. In the embodiment of the present invention, the corresponding reserved field is set to '1' as illustrated in FIG. 9 to represent whether the MAC header has been compressed.

In FIG. 9, the compressed MAC header can include HT field, EC field, Type file, ESF field, CI field, EKS field, Rsv field, LEN field and HCS field. The LEN field can include only a region, which represents the difference from the length of the previous MAC PDU, and can omit the other regions.

In other words, the base station can compress the LEN field, which represents the size of the MAC PDU, by using only the region representing the difference from the size of the previous PDU. In this case, if the MSB of 1 bit among 3 bits of the compressed LEN field is increased more than the previous PDU, it can be set to '1'. If the MSB of 1 bit is reduced, it can be set to '0'. Also, the region of the other 2 bits of the compressed LEN field represents increased or decreased size (bytes) to identify the size of the full MAC PDU with only the compressed LEN field. If the length of the PDU provides a given service using the above method, the size of the full PDU can be represented by the LEN field of a small bit.

Furthermore, in the compressed MAC header of FIG. 9, CID field of 16 bits can be replaced with CIND field of 8 bits as suggested in the embodiment of the present invention. After association between the base station and the mobile station is established, the mobile station can identify the base station and the service provided by the base station using the CIND allocated from the base station. Accordingly, if the MAC header uses CIND of 8 bits instead of CID of 16 bits, the region of 8 bits can be reduced.

However, if one or more bursts are transferred to the mobile station within one frame or several PDUs are concatenated by the same connection to constitute a burst, the base station transmits the MAC header of the PDU having the prior sequence number without compression as illustrated in FIG. 7 so that the MAC header may be used as a reference MAC header.

Figure 10:
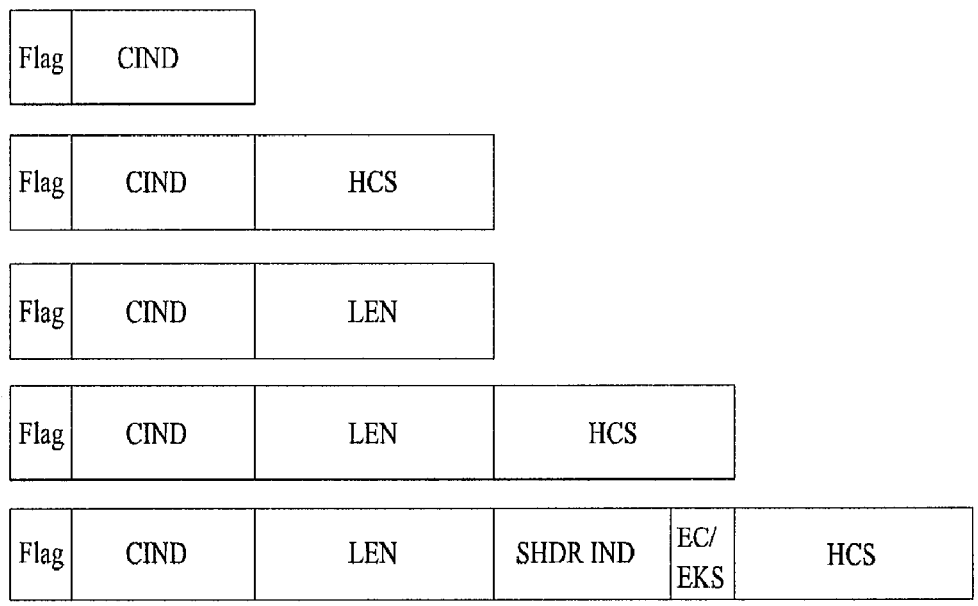
FIG. 10 is a diagram illustrating another example of a compressed MAC header according to the embodiment of the present invention.

FIG. 10 is a diagram illustrating another example of a compressed MAC header according to the embodiment of the present invention.

Referring to FIG. 10, a Flag field performs an indication function representing compression level and the MAC header has been compressed. Whether to compress the MAC header is determined in accordance with a value of the flag field, or the field of the compressed MAC header is varied depending on the value of the flag field. Also, the flag field can represent the compression level of the MAC header separately from the above. Preferably, the flag field can have a size of 1 bit to 3 bits. The MSB of 1 bit can represent whether the MAC header has been compressed, and the other bits can represent whether the MAC header has been compressed or the compression level. However, it is to be understood that the flag field is only illustrative to describe the embodiment of the present invention and its title or its value can be changed in accordance with a request of the system.

FIG. 10 illustrates various examples of configuring the compressed MAC header using the CIND and the flag field.

First of all, the compressed MAC header can include only a flag field and CIND for address allocation and identification of the MAC PDU.

Second, the compressed MAC header can include a flag field, a CIND field, and a header check sequence (HCS) field for checking whether error of the MAC header has occurred. At this time, the compressed MAC header can further include a LEN field representing the length of the full PDU.

Third, the compressed MAC header can include a flag field, a CIND LEN field, and HCS field.

Finally, the compressed header can include a subheader indication (SHDR IND) field, and encryption indication (EC/EKC) field. In this case, instead of CIND used in FIG. 10, the LSB region of the CID may be used in accordance with the system status and the user's request.

In FIG. 10, the compressed MAC header which does not include LEN field can be used if the MAC PDU having the same size as that of the previous MAC PDU is transmitted. Also, the MAC header, which does not include HCS field, can be used if header error check of the MAC header is not separately performed but error check of the full MAC PDU included in HARQ burst can be performed through error check of HARQ packet.

Figure 11:
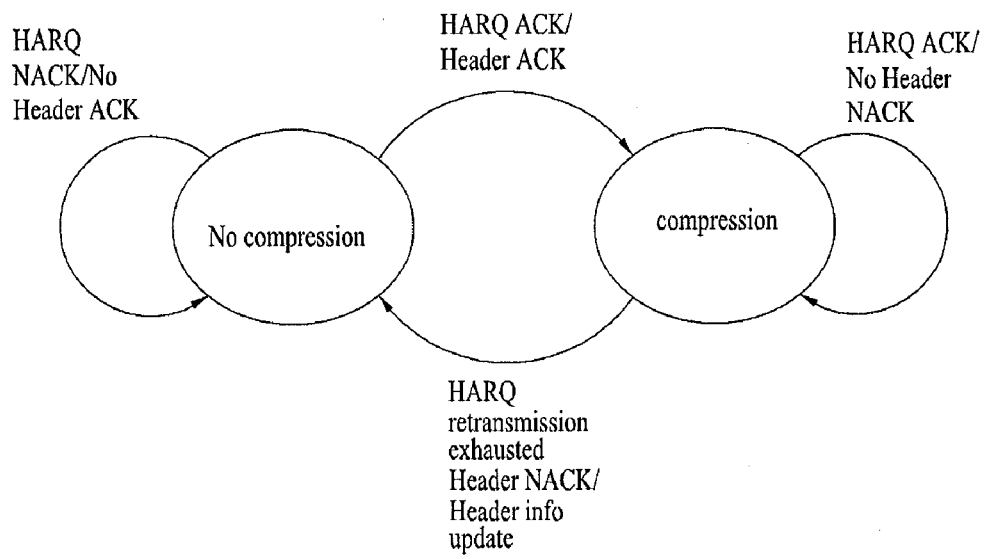
FIG. 11 is a state view illustrating a method of compressing MAC header in a transmitting side in accordance with the embodiment of the present invention.

FIG. 11 is a state view illustrating a method of compressing MAC header in a transmitting side in accordance with the embodiment of the present invention.

Referring to FIG. 11, 'No compression' state means that compression of the MAC header has not been performed. The transmitting side initially transmits the uncompressed MAC header. If ACK (Acknowledgement) signal is received from the receiving side, the transmitting side shifts the current state to 'compression' state for compression of the MAC header. The transmitting side compresses the MAC header in the 'compression' state and transmits the MAC PDU which includes the compressed MAC header to the receiving side. If NACK (Non-Acknowledgement) signal is not received or ACK signal of HARQ is received, the transmitting side maintains the 'compression' state. If the transmitting side receives NACK signal from the receiving side in a state that it transmits the compressed MAC header, the current state is shifted to 'No compression' state. Also, if the transmitting side exceeds the number of HARQ retransmission times or information included in the MAC header needs to be updated, the transmitting side shifts the current state to a state for transmitting the uncompressed MAC header. If the transmitting side receives NACK signal from the receiving side or does not receive ACK signal of HARQ, the transmitting side maintains the 'No compression' state.

The compression method used in FIG. 11 is preferably performed using the aforementioned method of compressing MAC header according to the present invention.

Figure 12:
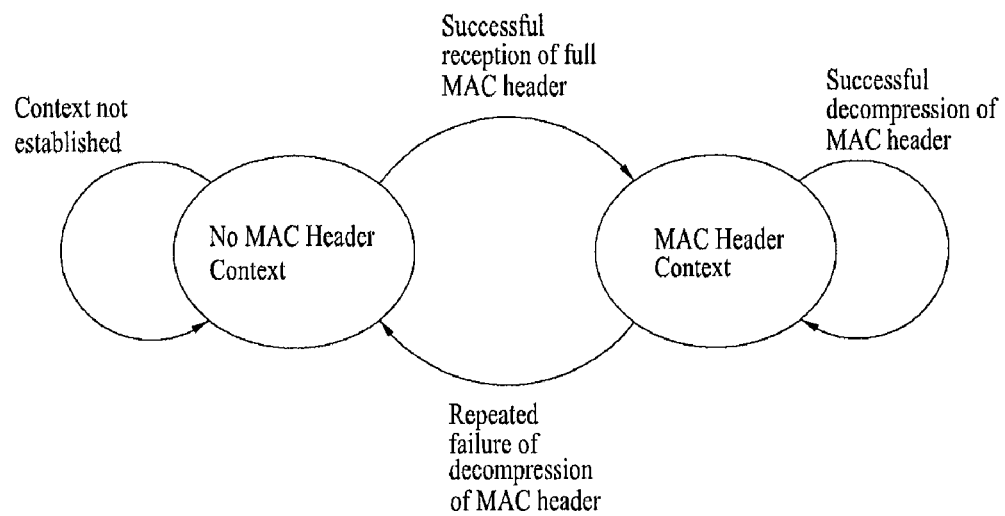
FIG. 12 is a state view illustrating a method of decompressing MAC header in a receiving side in accordance with the embodiment of the present invention.

FIG. 12 is a state view illustrating a method of decompressing MAC header in a receiving side in accordance with the embodiment of the present invention.

Referring to FIG. 12, the initial state is 'No MAC Header Context' state. If the uncompressed MAC header is normally received from the transmitting side, the receiving side transmits ACK signal to the transmitting side and enters 'MAC Header Context' state. If decompression of the compressed MAC header is successfully performed in the 'MAC Header Context' state, the receiving side continues to repeat the 'MAC Header Context' state. If decompression of the compressed MAC header is failed, the receiving side transmits NACK signal to the transmitting side, and shifts the current state to the 'No MAC Header Context' state. If the receiving side does not form context in the 'No MAC Header Context' state, it repeats the 'No MAC Header Context' state.

In other words, the receiving side performs MAC header information update according to MAC header reception, compression MAC header processing related to the MAC header information update, feedback transfer to the transmitting side if error occurs, and information update of the MAC header after state change. The compression method used in FIG. 12 is preferably performed using the aforementioned method of compressing MAC header according to the present invention.

Figure 13:
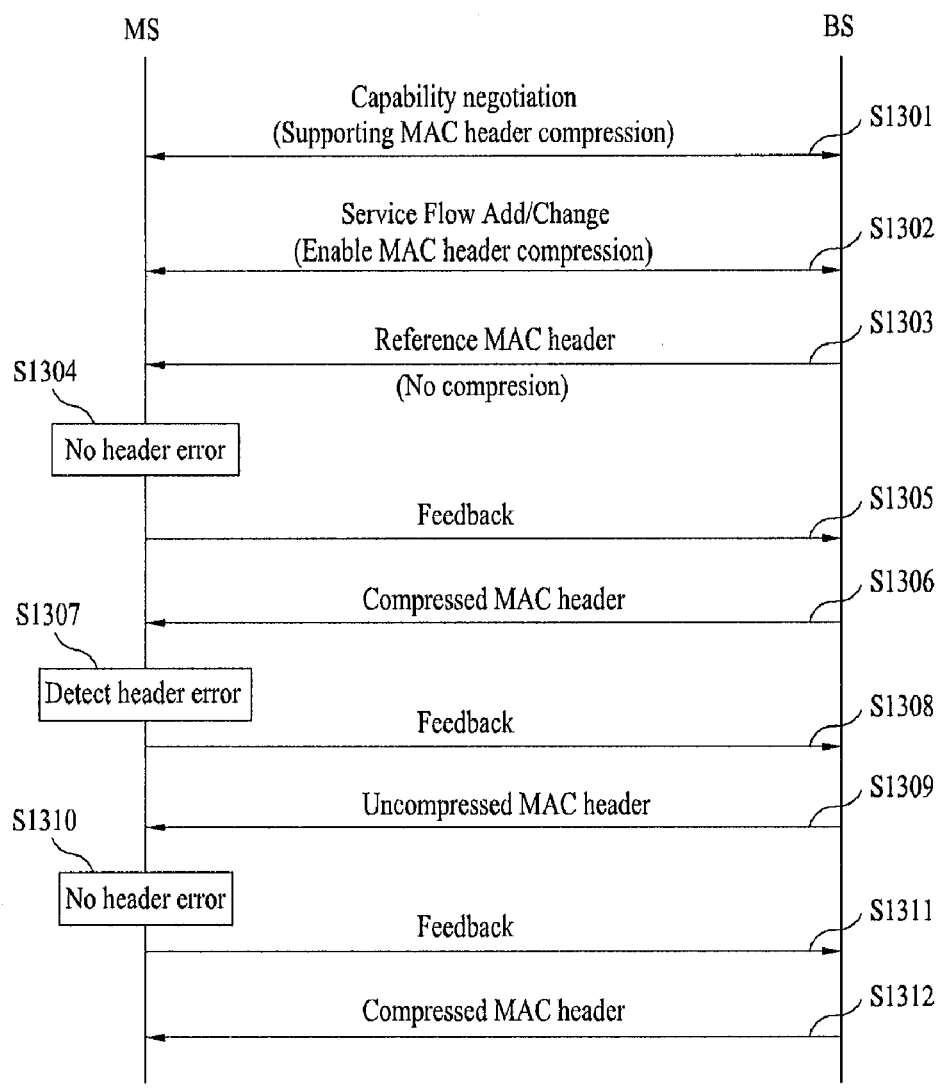
FIG. 13 is a flow chart illustrating a method of transmitting and receiving data using a method of compressing MAC header in accordance with the embodiment of the present invention.

FIG. 13 is a flow chart illustrating a method of transmitting and receiving data using a method of compressing MAC header in accordance with the embodiment of the present invention.

Referring to FIG. 13, the embodiment of the present invention is intended that the receiving side feeds back the detected error of the MAC header to the transmitting side to change compression level of the MAC header.

The mobile station can negotiate whether to support compression of the MAC header with the base station when being registered with the base station (S1301).

If the base station and the mobile station support compression of the MAC header, the mobile station can activate compression of the MAC header during the procedure of generating a service flow (SF) after being registered with the base station (S1302).

Afterwards, if data of the service flow occur, the base station can transmit information of the reference MAC header, which is not compressed, to the mobile station (S1303).

After receiving information of the reference MAC header, which is not compressed, the mobile station checks whether error has occurred (S1304). If error has not occurred, the mobile station transmits ACK signal to the base station through a feedback message (S1305). In step S1305, for feedback of compression information of the MAC header, the mobile station and the base station can define a separate MAC management feedback message or use the existing ARQ feedback or HARQ ACK/NACK signaling method.

The base station which has received the MAC header feedback (ACK) message from the mobile station transmits data using the compressed MAC header (1306). The mobile station checks whether error has occurred in the compressed MAC header received from the base station (S1307). If error has occurred in the MAC header received from the base station in step S1307, the mobile station transmits NACK signal to the base station through the feedback message (S1308). The base station which has received the NACK signal transmits MAC PDU to the mobile station by adjusting compression level of the MAC header, wherein the MAC PDU includes the uncompressed MAC header (S1309). The mobile station checks whether error has occurred in the MAC header whenever receiving the MAC PDU which includes the MAC header from the base station (S1310). If error of the MAC header is not detected in step S1310, the mobile station transmits the feedback message to the base station, wherein the feedback message includes ACK signal (S1311). Since the base station has received the ACK signal from the mobile station, the base station again transmits MAC PDU to the mobile station, wherein the MAC PDU includes the compressed MAC header (S1312).

In FIG. 13, the method of compressing MAC header of a downlink service flow has been exemplarily described in accordance with the embodiment of the present invention. However, when compressing MAC header of an uplink service flow, the mobile station performs compression of the MAC header while the base station transmits a feedback message to the mobile station, wherein the feedback message includes ACK/NACK signal. In other words, in the downlink, the transmitting side can serve as the base station, and the receiving side can serve as the mobile station. In the uplink, the transmitting side can serve as the mobile station, and the receiving side can serve as the base station.

Furthermore, it has been described in FIG. 13 that the compressed MAC header and the uncompressed MAC header have been transmitted through feedback in accordance with whether error of the header has occurred in the receiving side. In this case, if update of the MAC header is needed due to information change of the MAC header (for example, length change of MAC PDU and ciphering key change of MAC PDU), the transmitting side can transmit the MAC header, which includes the changed information, to the receiving side.

Figure 14:
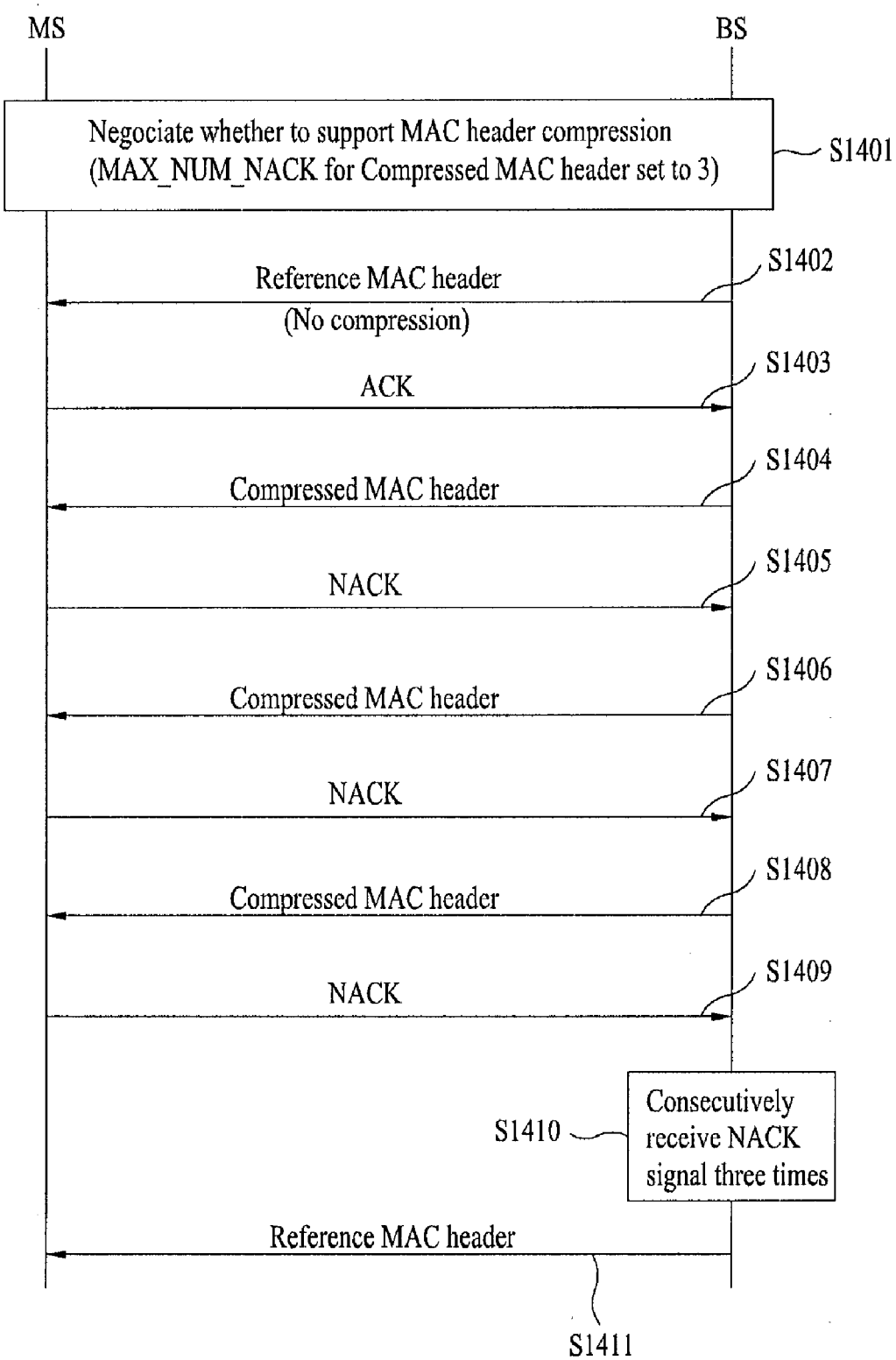
FIG. 14 is a flow chart illustrating a case where a transmitting side receives predetermined continuous NACK signals from a receiving side when transmitting compressed MAC header.

FIG. 14 is a flow chart illustrating a case where the transmitting side receives predetermined continuous NACK signals from the receiving side when transmitting the compressed MAC header.

Referring to FIG. 14, the mobile station can negotiate with the base station as to whether to support compression of the MAC header during the network entry step and the service flow creation step (S1401). At this time, the mobile station and the base station can previously define the number of reception failure times of continuous MAC PDUs including the compressed MAC header. In the embodiment of the present invention, it is assumed that the number of reception failure times of the MAC PDU or the number of times for receiving a feedback message, which includes NACK signal, from the mobile station is three times.

If data of the service flow occur between the mobile station and the base station, the base station can transmit a reference MAC header, which is not compressed, to the mobile station (S1402).

The mobile station receives information of the uncompressed MAC header, and checks whether error has occurred in the received MAC header. If error is not detected, the mobile station transmits a feedback message, which includes ACK signal, to the base station (S1403). In step S1403, for feedback of compression information of the MAC header, the mobile station and the base station can define a separate MAC management feedback message or use the existing ARQ feedback or HARQ ACK/NACK signaling method.

The base station which has received the feedback (ACK) message from the mobile station transmits the compressed MAC header to the mobile station (1404).

The mobile station which has received the MAC PDU including the compressed MAC header checks whether error has occurred in the compressed MAC header. If error has occurred in the compressed MAC header, the mobile station transmits the feedback message, which includes NACK signal, to the base station (S1405).

The base station which has received the feedback message counts the number of times of the received NACK signals, and retransmits MAC PDU, which includes the MAC header compressed in step 1404, to the mobile station (S1406).

The mobile station checks whether error has occurred in the MAC header received in step S1406, and transmits the feedback message, which includes NACK signal, to the base station if error has occurred (S1407).

The base station which has received the feedback message counts the number of times of the received NACK signals, and retransmits MAC PDU, which includes the compressed MAC header, to the mobile station (S1408).

In step S1408, if error has occurred in the compressed MAC header received from the base station, the mobile station transmits the feedback message to the base station, wherein the feedback message includes NACK signal (S1409).

The base station counts the number of times of the NACK signals included in the feedback message transmitted from the mobile station, or the number of reception failure times (S1410). The base station which has received the reception failure message of the compressed MAC header or the feedback message including the NACK signal from the mobile station as much as the number of previously defined times (for example, three times) transmits the MAC PDU, which includes the uncompressed MAC header to the mobile station (S1411).

In FIG. 14, the method of compressing MAC header of a downlink service flow has been exemplarily described in accordance with the embodiment of the present invention. However, when compressing MAC header of an uplink service flow, the mobile station performs compression of the MAC header while the base station feeds back ACK/NACK signal to the mobile station. In other words, in the downlink, the transmitting side can serve as the base station, and the receiving side can serve as the mobile station. In the uplink, the transmitting side can serve as the mobile station, and the receiving side can serve as the base station.

Figure 15:
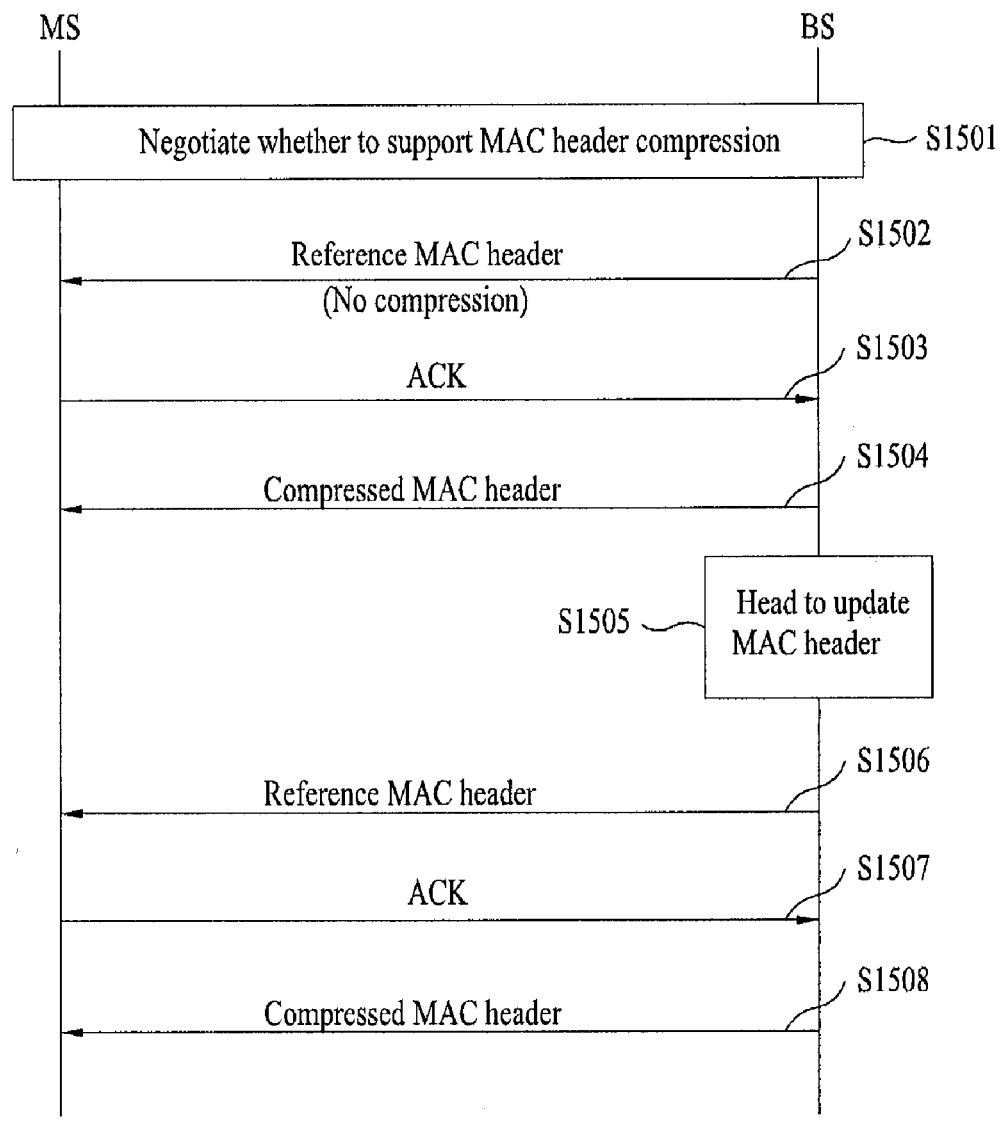
FIG. 15 is a flow chart illustrating a method of transmitting and receiving data in case where information change of MAC header is needed when transmitting compressed MAC header.

FIG. 15 is a flow chart illustrating a method of transmitting and receiving data in case where information change of the MAC header is needed when transmitting the compressed MAC header.

Referring to FIG. 15, the mobile station can negotiate with the base station as to whether to support compression of the MAC header during the network entry step and the service flow creation step (S1501).

Afterwards, if data of the service flow occur between the mobile station and the base station, the base station transmits the reference MAC header, which is not compressed, to the mobile station (S1502).

After receiving information of the uncompressed MAC header, the mobile station checks whether error has occurred in the compressed MAC header. If error is not detected, the mobile station transmits a feedback message, which includes ACK signal, to the base station (S1503). In step S1503, to transmit a feedback message of compression information of the MAC header, the mobile station and the base station can define a separate MAC management feedback message or use the existing ARQ feedback or HARQ ACK/NACK signaling method.

The base station, which has received the MAC header feedback message including ACK signal from the mobile station, compresses the MAC header, and transmits MAC PDU, which includes the compressed MAC header, to the mobile station (1504).

In step S1504, when the base station provides the service to the mobile station using the compressed MAC header, update of the MAC header may be required due to information change of the MAC header (S1505).

The base station generates the MAC PDU using the MAC header including the changed header information and transmits the generated MAC PDU to the mobile station (S1506). In step S1506, the MAC header which includes changed header information is transmitted in a state that it is uncompressed.

The mobile station checks whether error has occurred in the MAC header received in step S1506. If error is not detected in the uncompressed MAC header, the mobile station transmits a feedback message, which includes ACK signal, to the base station (S1507).

In step S1507, the base station which has received ACK signal compresses the MAC header, and transmits MAC PDU, which includes the compressed MAC header, to the mobile station (S1508).

In FIG. 15, there may be several methods of compressing the MAC header in the base station during step S1504 and step S1508. Preferably, the methods of compressing MAC header according to the embodiments of the present invention are used.

In FIG. 15, the method of transmitting and receiving data using the compressed MAC header of a downlink service flow has been exemplarily described in accordance with the embodiment of the present invention. However, when compressing MAC header of an uplink service flow, the mobile station performs compression of the MAC header while the base station transmits a feedback message, which includes ACK/NACK signal, to the mobile station. In other words, in the downlink, the transmitting side can serve as the base station, and the receiving side can serve as the mobile station. In the uplink, the transmitting side can serve as the mobile station, and the receiving side can serve as the base station.

Generally, CID can serve to allocate uplink resources and/or downlink resources, allocate MAC PDU address, and identify services. However, if the CID is always used, it may act as unnecessary overhead. Accordingly, overhead can be reduced in such a manner that different parameters are used for each function of the CID.

Hereinafter, a method of performing resource allocation of CID using the mobile station identifier (MS ID), and performing service flow identification for identifying services using CIND will be described in detail.

The MS ID for identifying a specific mobile station in the base station can have bits (for example, 12 to 14 bits) smaller than those of general CID. Also, basic CID can be reused. CIND used in the mobile station to identify the SF can have smaller bits (for example, 4 to 6 bits).

Figure 16:
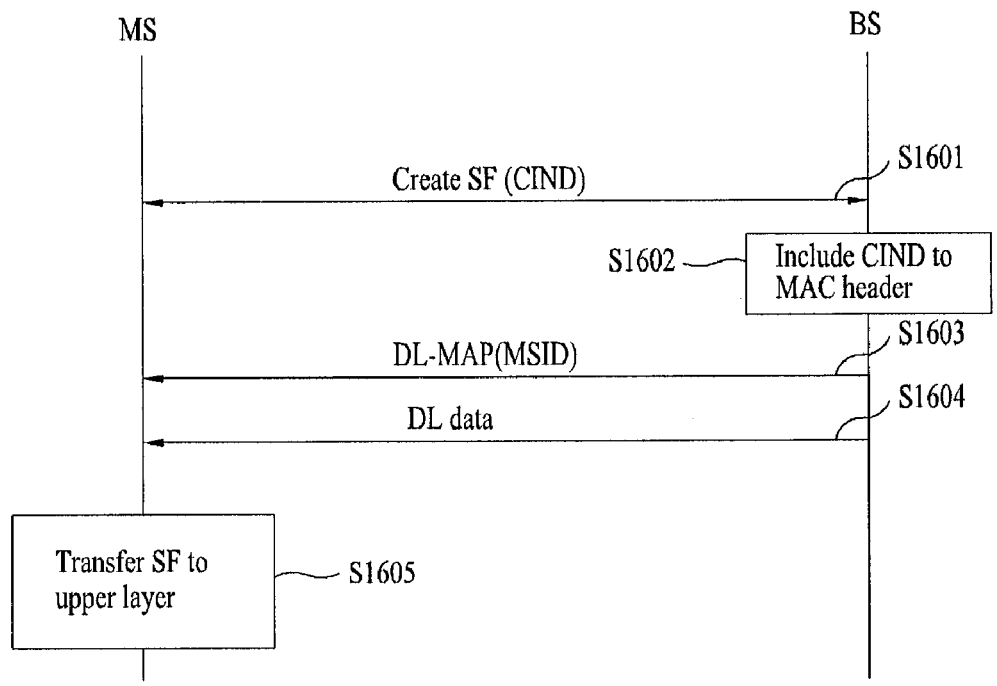
FIG. 16 is a diagram illustrating a method of allocating resources and service flow using MS ID and CIND in a downlink.

FIG. 16 is a diagram illustrating a method of allocating resources and service flow using MS ID and CIND in a downlink.

The base station can generate CIND to identify services during SF creation and allocate the generated CIND to the mobile station. The CIND identifies a type of services within the mobile station (S1601).

The base station can identify the corresponding service flow by including CIND in the header of the MAC PDU during data transmission of the corresponding service flow. The CIND within the mobile station can be used to identify the corresponding service flow (S1602).

At this time, resource allocation for transmission of the MAC PDU of the corresponding mobile station is performed through the downlink map (DL-MAP). The base station can allocate MS ID to represent whether to allocate resources to a specific mobile station in the downlink map. The mobile station can identify whether resources have been allocated, through MS ID included in the DL-MAP (S1603).

The base station transmits downlink data to the mobile station, wherein the downlink data includes the MAC header generated in S1602.

The mobile station decompresses CIND included in the MAC header and transfers SF to the upper layer. Also, the mobile station can receive downlink data in a resource region allocated through the DL-MAP (S1605).

Figure 17:
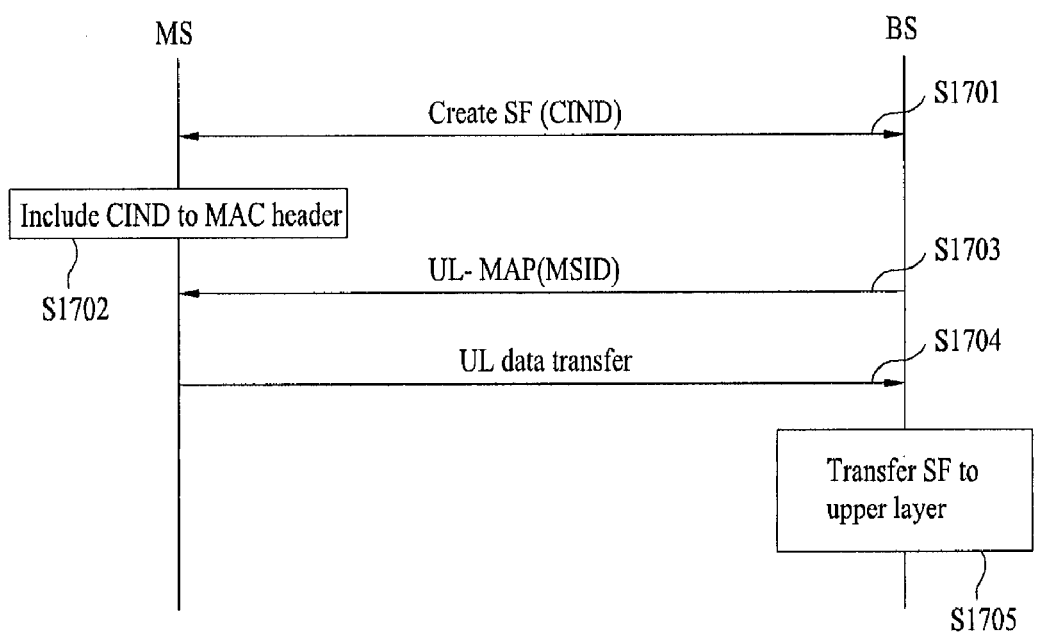
FIG. 17 is a diagram illustrating a method of allocating resources and service flow using MS ID and CIND in an uplink.

FIG. 17 is a diagram illustrating a method of allocating resources and service flow using MS ID and CIND in an uplink.

FIG. 17 is similar to FIG. 16 except that services are identified in the uplink and resources of the uplink are allocated. The base station (BS) can generate CIND to identify services during SF creation and allocate the generated CIND to the mobile station (MS). The CIND identifies a type of services within the mobile station (S1701).

The mobile station can include CIND in the header of the MAC PDU during data transmission of the corresponding service flow. The CIND within the mobile station can be used to identify the corresponding service flow (S1702).

At this time, the base station can allocate uplink resources to receive MAC PDU of the uplink from the mobile station. Uplink resource allocation of the base station is performed through the uplink map (UL-MAP). The base station can transmit the UL-MAP, which includes MS ID, to the mobile station so as to represent whether to allocate uplink resources to a specific mobile station in the uplink map. The mobile station can identify whether resources have been allocated, through MS ID included in the UL-MAP (S1703).

The mobile station can transmit uplink data to the base station using an uplink resource region allocated through the UL-MAP (S1704).

If uplink data are received, the base station can recognize CIND included in the MAC header of UL data. Accordingly, the base station can recognize information of the service flow from the mobile station by identifying CIND. The base station can transfer the service flow mapped with the CIND to the upper layer (S1705).

According to another embodiment of the present invention, the base station can use CIND as an element for configuring the MAC header in FIG. 16 and FIG. 17. At this time, CIND can be used to identify the service flow for user data transfer in the mobile station, and can also be used to transfer MAC management message for control between the mobile station and the base station. CIND for MAC management message transfer can be established previously between the mobile station and the base station.

For example, the base station can fix CIND for MAC management message transfer, which is susceptible to time latency and has high scheduling priority, to '0', and can fix CIND for MAC management message transfer, which is less susceptible to time latency and has low scheduling priority, to '1'. In this case, a separate procedure of allocating CIND included in the MAC header for MAC management message transfer may not be performed.

Figure 18:
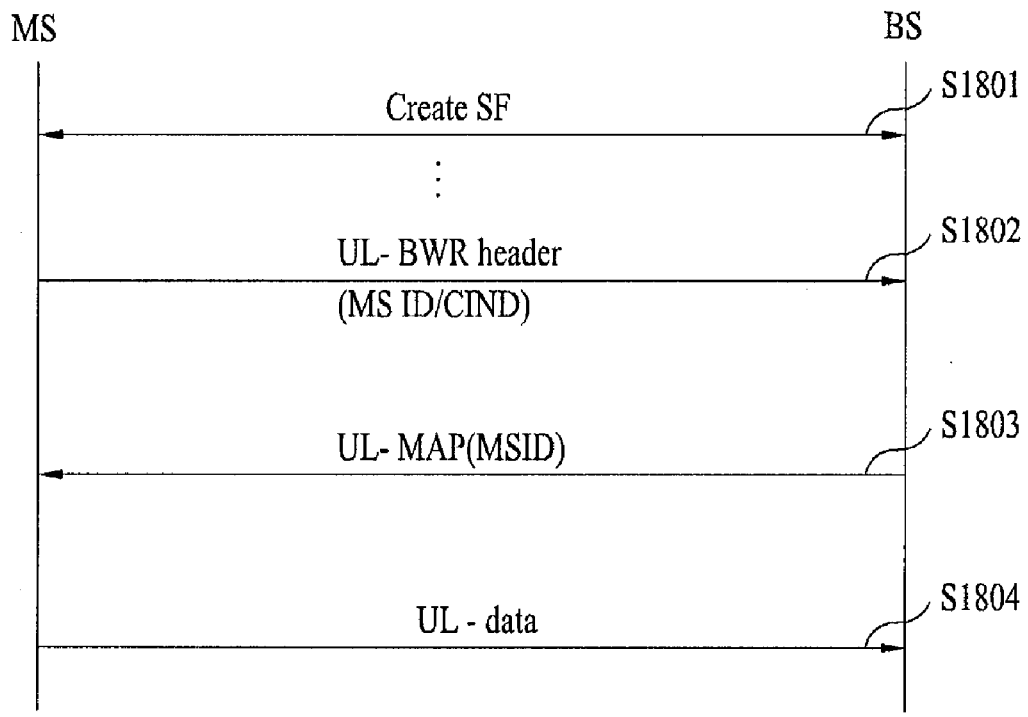
FIG. 18 is a diagram illustrating a method of requesting a base station from a mobile station to allocate uplink resources if CIND is used for service identification.

FIG. 18 is a diagram illustrating a method of requesting a base station from a mobile station to allocate uplink resources if CIND is used for service identification.

Referring to FIG. 18, an uplink resource allocation request message (for example, uplink bandwidth request (UL-BWR) header) can be used when the mobile station is not allocated with uplink resources dedicated for itself and requests uplink resource allocation through a contention based random access channel with respect to the other mobile stations.

The service flow (SF) can be created between the mobile station (MS) and the base station (BS). The base station can allocate CIND to the mobile station to identify the service flow during service flow creation (S1801).

The mobile station can transmit a random uplink sequence for uplink resource allocation request to the base station. If uplink resource allocation of the corresponding sequence is performed, the mobile station can transmit the resource allocation request message (or header), which includes MS ID and CIND, to the base station. Accordingly, the base station can perform identify the mobile station as soon as identify the service flow (S1802).

As a result, the base station can transmit the UL-MAP, which includes US ID, to the mobile station so as to allocate uplink resources (S1803).

The mobile station can transmit uplink data to the base station using the uplink resource region allocated in step S1803 (S1804).

Figure 19:
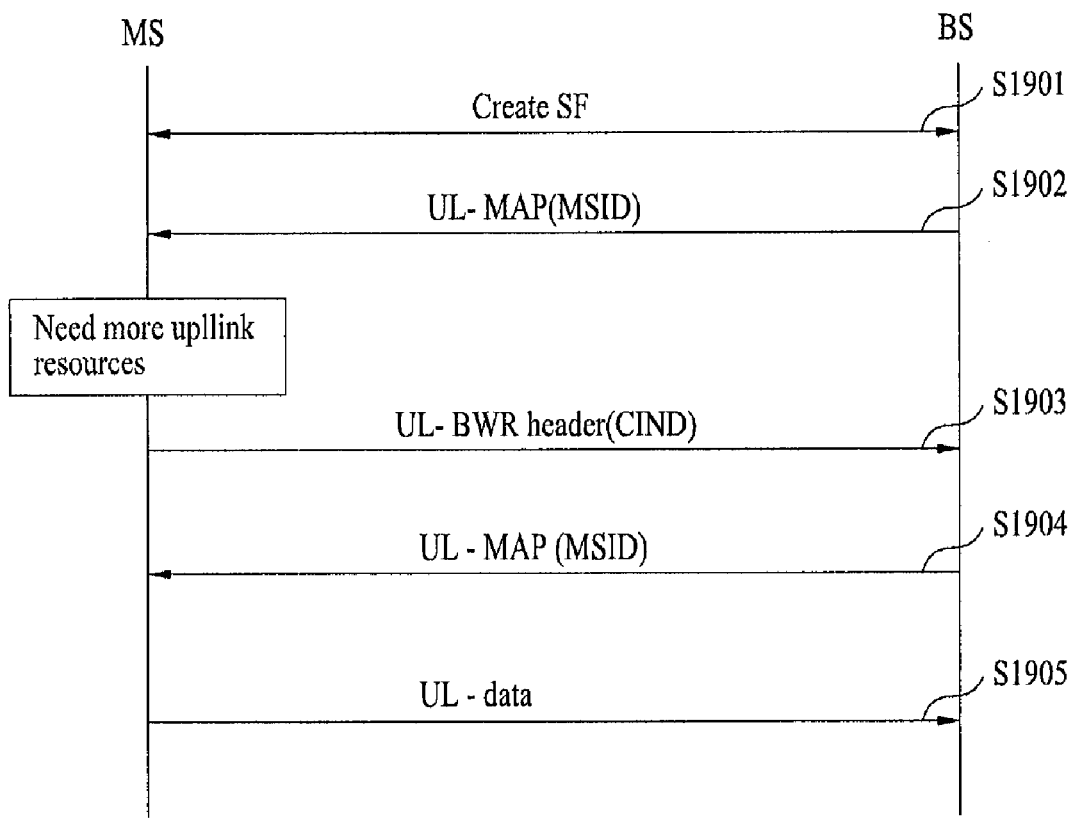
FIG. 19 is a diagram illustrating another method of requesting a base station from a mobile station to allocate uplink resources if CIND is used for service identification.

FIG. 19 is a diagram illustrating another method of requesting a base station from a mobile station to allocate uplink resources if CIND is used for service identification.

The service flow (SF) can be created between the mobile station (MS) and the base station (BS). At this time, the base station can generate CIND to identify the service flow and allocate the generated CIND to the mobile station (S1901).

The base station can allocate uplink resources dedicated for a specific mobile station by transmitting the uplink map (UL-MAP), which includes MS ID, to the mobile station (S1902).

However, the mobile station maybe needs uplink resources more than uplink resources allocated from the base station. Accordingly, the mobile station can transmit the uplink resource allocation request message (for example, UL-BWR header), which includes only CIND, to request allocation of more uplink resources. In other words, the mobile station can request additional uplink resource allocation using the uplink resources, which are allocated from the base station to the mobile station through the UL-MAP (S1903).

Since the UL-BWR has been received through the uplink which has already allocated MS ID, the base station can identify the corresponding mobile station and its service flow even though it receives the UL-BWR header, which includes only CIND in step S1903.

To allocate more uplink resources requested from the mobile station, the base station can transmit the UL-MAP to the mobile station, wherein the UL-MAP includes MS ID (S1904).

The mobile station can transmit uplink data through the uplink resource region allocated from the base station (S1905).

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a mobile access system. Also, the present invention can be applied to a method of generating MAC header and a method of transmitting data using the generated MAC header.

What is claimed is:

1. A method of receiving data at a receiving side of a mobile communication system, the method comprising:
   receiving data from a transmitting side, the data including a first media access control (MAC) header that is uncompressed;
   transmitting a message to the transmitting side, the message including an ACK signal if there is no error in the first MAC header or including a NACK signal if there is an error in the first MAC header; and
   receiving data from the transmitting side, the data including a second MAC header generated in accordance with the message,
   wherein the second MAC header is generated by compression if the message includes the ACK signal or is generated without compression if the message includes the NACK signal,
   wherein the second MAC header that is generated by compression includes at least a flag field indicating whether the second MAC header has been compressed, a connection index (CIND) for identifying a service flow (SF), an error detection field for detecting whether the header has an error, or a field representing a size of a MAC message, and
   wherein the CIND is uniquely used to identify the SF within the receiving side.

2. The method of claim 1, wherein the field representing the size of the MAC message represents an increased or decreased size of a current MAC message with respect to a previous MAC message.

3. The method of claim 1, wherein the flag field includes at least an information bit representing whether compression has been performed or an information bit representing a compression level.

4. A method of transmitting data from a transmitting side of a mobile communication system, the method comprising:
   transmitting data including a first media access control (MAC) header that is uncompressed;

generating a second MAC header that is compressed if a message including an ACK signal is received from a receiving side or generating a second MAC header which is uncompressed if a message including a NACK signal is received from the receiving side; and transmitting data to the receiving side, the data including the second MAC header, wherein the second MAC header that is compressed includes at least a flag field indicating whether the second MAC header has been compressed, a connection index (CIND) for identifying a service flow (SF), an error detection field for detecting whether the header has an error, or a field representing a size of MAC message, and wherein the CIND is uniquely used to identify the SF within the receiving side.

5. The method of claim 4, wherein if the message including the NACK signal is received, the method further comprises:

transmitting the data including the second compressed MAC header until the message including the ACK signal is transmitting the data including the second uncompressed MAC header if the transmitting side receives the message including the NACK signal up to a predetermined number of times.

6. The method of claim 5, wherein the method further comprises:

transmitting a third uncompressed MAC header, which includes information included in the second compressed MAC header, to the receiving side if update of the second MAC header is needed due to change of information included in the second compressed MAC header.

* * * * *